US012709396B2

(12) United States Patent
Chen et al.

(10) Patent No.: US 12,709,396 B2
(45) Date of Patent: Aug. 18, 2026

(54) AIR DIFFUSER AND CONSTRUCTION METHOD THEREOF

(71) Applicant: The Boeing Company, Chicago, IL (US)

(72) Inventors: Chun Chen, Hong Kong (CN); Yue Pan, Hong Kong (CN); Chao-Hsin Lin, Seattle, WA (US); Daniel Wei, Beijing (CN)

(73) Assignee: The Boeing Company, Arlington, VA (US)

( * ) Notice: Subject to any disclaimer, the term of this patent is extended or adjusted under 35 U.S.C. 154(b) by 550 days.

(21) Appl. No.: 18/002,530

(22) PCT Filed: Jun. 9, 2021

(86) PCT No.: PCT/CN2021/099229

§ 371 (c)(1),
(2) Date: Dec. 20, 2022

(87) PCT Pub. No.: WO2022/017046

PCT Pub. Date: Jan. 27, 2022

(65) Prior Publication Data

US 2023/0242259 A1 Aug. 3, 2023

(30) Foreign Application Priority Data

Jul. 24, 2020 (CN) ......................... 202010724794.1

(51) Int. Cl.
*B64D 13/00* (2006.01)

(52) U.S. Cl.
CPC .................................... *B64D 13/00* (2013.01)

(58) Field of Classification Search
CPC .............. B64D 13/00; B64D 2013/003; B64D 2013/0625

(Continued)

(56) References Cited

U.S. PATENT DOCUMENTS 3,513,881 A 5/1970 Kinsell
5,014,609 A * 5/1991 Weck .................... F24F 13/072 454/301

(Continued)

FOREIGN PATENT DOCUMENTS

CN 101590912 A 12/2009
CN 108248869 7/2018

(Continued)

OTHER PUBLICATIONS

Japan Patent Office, Office Action, App. No. 2023-504726 (Apr. 1, 2025).

(Continued)

*Primary Examiner* — Steven B McAllister
*Assistant Examiner* — Charles R Brawner
(74) *Attorney, Agent, or Firm* — Walters & Wasylyna LLC

(57) ABSTRACT

Provided is an air diffuser and a construction method thereof. The air diffuser is especially applied to the field of civil aircrafts. The air diffuser comprises: an open upper end part; an open lower end part; and an air flow passage defined between the open upper end part and the open lower end part, the air flow passage comprising a first side wall and a second side wall which are connected between the open upper end part and the open lower end part and are symmetrically located with respect to a vertical center plane of the air diffuser; wherein the section outline of each of the first side wall and the second side wall has a curved shape bending inwards, such that in a direction from the open upper end part to the open lower end part, the air flow passage has, in sequence, a contraction portion bending toward the vertical center plane and an expansion portion away from the vertical center plane.

20 Claims, 17 Drawing Sheets

(58) Field of Classification Search
USPC ........................................................ 454/76
See application file for complete search history.

(56) References Cited

U.S. PATENT DOCUMENTS

| | | | | |
|---|---|---|---|---|
| 6,776,710 | B1 * | 8/2004 | Messmer | F24F 13/072 454/305 |
| 2014/0191059 | A1 * | 7/2014 | Baffigi | B05B 7/0815 239/11 |
| 2018/0029717 | A1 * | 2/2018 | Al-Alusi | B64D 13/00 |
| 2020/0148367 | A1 * | 5/2020 | Vandyke | B64D 13/06 |
| 2021/0107337 | A1 * | 4/2021 | Othmer | B60H 1/00564 |
| 2023/0069422 | A1 * | 3/2023 | Zhang | B60H 1/345 |

FOREIGN PATENT DOCUMENTS

| | | |
|---|---|---|
| CN | 109140732 A | 1/2019 |
| CN | 109250121 | 1/2019 |
| CN | 209263293 | 8/2019 |
| CN | 112060873 | 12/2020 |
| DE | 3435602 | 7/1986 |
| EP | 0104435 | 4/1984 |
| EP | 3 967 603 | 3/2022 |
| JP | 55-037415 U | 3/1980 |
| JP | 2002-316533 | 10/2002 |
| JP | 2002316533 A * | 10/2002 |

OTHER PUBLICATIONS

China National Intellectual Property Administration, Office Action, with English translation, App. No. 2020107247941 (Dec. 5, 2024).
Translation of CN209263293U (Aug. 16, 2019).
Translation of JP2002316533A (Oct. 29, 2002).
China National Intellectual Property Administration, Office Action, App. No. 202010724794.1 (Apr. 17, 2025).
European Patent Office, Extended European Search Report, App. No. 21845794.3 (Dec. 4, 2023).
China National Intellectual Property Administration, Office Action, with English translation, App. No. 202010724794.1 (Jun. 24, 2025).
China National Intellectual Property Administration, International Search Report, Intl. App. No. PCT/CN2021/099229 (Sep. 16, 2021).
National Institute of Industrial Property (Brazil): Office Action, App. No. BR112022025953-0 (Sep. 23, 2025).

* cited by examiner

AIR DIFFUSER AND CONSTRUCTION METHOD THEREOF

This application is the U.S. national stage entry under 35 U.S.C. § 371 of Intl. Pat. App. No. PCT/CN2021/099229 filed on Jun. 9, 2021, which claims priority from Chinese Pat. App. No. 202010724794.1 filed on Jul. 24, 2020. The entire contents of Intl. App. No. PCT/CN2021/099229 and Chinese Pat. App. No. 202010724794.1 are incorporated herein by reference.

TECHNICAL FIELD

The disclosure relates to the technology of ventilation diffusers in the field of transportation, in particular to an air diffuser and a construction method thereof. More specifically, the disclosure relates to an air diffuser applied to civil aircraft and a construction method thereof.

BACKGROUND

In a ventilation system of a civil aircraft, air is supplied into a cabin through an air diffuser, so as to control an airflow field structure within the cabin to ensure a comfortable environment within the cabin. In research on the air diffuser of the civil aircraft, most focus is put on the air supplying uniformity of the air diffuser, as well as the influence on the airflow field and the temperature field within the cabin.

At present, an orifice plate is mounted within the air diffuser of the civil aircraft and an outlet is designed to be a grid structure for achieving a good air supplying uniformity. However, when the system is in operation, the grid-type design may result in a lot of dust deposition around the air supply outlet. When passengers see the dust, they may easily have the impression that the air quality within the cabin is poor and thus may take the same type of aircraft less in the future, which may obviously decrease the market competition ability of this type of civil aircraft. Meanwhile, cleaning these dust deposition consumes a great labor and resource cost, which may increase the operation and maintenance cost for an airline company. In addition, the orifice plate and the grid may increase the weight of the air diffuser, thereby increase the oil consumption during a flight of the aircraft, which further increase the operational cost for the airline company.

FIG. 1 is a schematic diagram of the position in the cabin of the air diffuser on the civil aircraft in a prior art. FIG. 2 is a schematic diagram of the overall structure of the air diffuser on the civil aircraft in the prior art. With reference to FIG. 1 and FIG. 2, the air diffuser 1 is located between a side wall 2 of the cabin and the luggage compartment 3, the air diffuser 1 is connected to an air supply pipe 4 at the upper end and is in fluid communication with the inner space of the cabin at the lower end. Air enters through the air supply pipe 4 at first. The tail end of the air supply pipe 4 is connected to the air diffuser 1. Air enters the inner space of the cabin after going through the air diffuser 1. To achieve the good air supplying uniformity, an open lower end part (namely an outlet end) of the existing air diffuser 1 is designed as a grid structure 6, as illustrated in FIG. 2. However, when the system is in operation, the design of grid structure 6 may result in a lot of dust deposition around the open lower end part. In addition, to achieve the good air supplying uniformity, an orifice plate 5 is mounted within the existing air diffuser 1, as illustrated in FIG. 2. However, when the system is in operation, the orifice plate 5 may increase air resistance, increase the weight of the air diffuser, and increase noise.

SUMMARY

The disclosure aims to overcome defects of an air diffuser in the prior art, and provide a structure of an air diffuser which does not need the orifice plate and the grid structure, which ensures an air supplying uniformity as well as avoiding dust deposition around an air supply outlet. The air diffuser of the disclosure is light, and its operation and maintenance cost is reduced greatly.

An aspect of the disclosure is an air diffuser. The air diffuser comprises: an open upper end part; an open lower end part; and an air flow passage defined between the open upper end part and the open lower end part, the air flow passage comprising a first side wall and a second side wall which are connected between the open upper end part and the open lower end part and are symmetrically located with respect to a vertical center plane of the air diffuser; wherein the section outline of each of the first side wall and the second side wall has a curved shape bending inwards, such that in a direction from the open upper end part to the open lower end part, the air flow passage has, in sequence, a contraction portion bending toward the vertical center plane and an expansion portion away from the vertical center plane.

Furthermore, the curved shape comprises a first arc-shaped part and a second arc-shaped part connected in sequence in the direction from the open upper end part to the open lower end part.

Furthermore, the first arc-shaped part is curved towards the vertical center plane, a first end of the first arc-shaped part is connected to the open upper end part, and the width of the air flow passage at at least a part of the first arc-shaped part is less than or equal to the width of the open upper end part between the first side wall and the second side wall.

Furthermore, the second arc-shaped part is curved towards the vertical center plane, a first end of the second arc-shaped part is connected to a second end of the first arc-shaped part, and a second end of the second arc-shaped part is connected to the open lower end part.

Furthermore, the first arc-shaped part is formed such that the radius of curvature of the first arc-shaped part is less than the radius of curvature of the second arc-shaped part.

Furthermore, the first arc-shaped part is formed such that the distance from the first end of the first arc-shaped part to the vertical center plane is identical to the distance from the second end of the first arc-shaped part to the vertical center plane.

Furthermore, the second arc-shaped part is formed such that the second arc-shaped part at its second end is tangent to the plane in which the second arc-shaped part contacts and connects with the open lower end part.

Furthermore, a connection point is formed where the second end of the first arc-shaped part being connected to the first end of the second arc-shaped part, wherein an included angle formed by the tangent line to the first arc-shaped part at the connection point and the tangent line to the second arc-shaped part at the connection point is less than or equal to 20 degrees.

Furthermore, the width of the open lower end part between the first side wall and the second side wall is greater than the width of the open upper end part between the first side wall and the second side wall.

Furthermore, the ratio of the width of the open lower end part and the width of the open upper end part is about 2:1.

Furthermore, the air diffuser has an average air supply speed ranging from 3 m/s to 4 m/s at the open lower end part.

Furthermore, the air diffuser has an average air supply angle ranging from 30 degrees to 40 degrees at the open lower end part.

Furthermore, the air diffuser further comprises a front wall and a rear wall which are parallel to each other and parallel to the direction from the open upper end part to the open lower end part.

Preferably, the air diffuser is used on a transportation vehicle.

Preferably, the transportation vehicle is an aircraft, and the air diffuser is mounted within a cabin of the aircraft.

Another aspect of the disclosure is a method for construction of an air diffuser, comprising:

providing an open upper end part and an open lower end part of the air diffuser; and configuring a first side wall and a second side wall which are connected between the open upper end part and the open lower end part and symmetrically positioned with respect to a vertical center plane of the air diffuser, the first side wall and the second side wall define an air flow passage between the open upper end part and the open lower end part; wherein configuring the first side wall and the second side wall comprises: forming the section outline of each of the first side wall and the second side wall into a curved shape bending inwards, such that in a direction from the open upper end part to the open lower end part, the air flow passage has, in sequence, a contraction portion bending towards the vertical center plane and an expansion portion away from the vertical center plane.

Furthermore, the curved shape is formed so as to comprise a first arc-shaped part and a second arc-shaped part connected in sequence in the direction from the open upper end part to the open lower end part.

Furthermore, the first arc-shaped part is formed so as to curve towards the vertical center plane, such that the width of the air flow passage at at least a part of the first arc-shaped part is less than or equal to the width of the open upper end part between the first side wall and the second side wall, and wherein a first end of the first arc-shaped part is connected to the open upper end part.

Furthermore, the second arc-shaped part is formed so as to curve towards the vertical center plane, wherein a first end of the second arc-shaped part is connected to a second end of the first arc-shaped part, and a second end of the second arc-shaped part is connected to the open lower end part.

Furthermore, the first arc-shaped part is formed such that the radius of curvature of the first arc-shaped part is less than the radius of curvature of the second arc-shaped part.

Furthermore, the first arc-shaped part is formed such that the distance from the first end of the first arc-shaped part to the vertical center plane is identical to the distance from the second end of the first arc-shaped part to the vertical center plane.

Furthermore, the second arc-shaped part is formed such that the second arc-shaped part at its second end is tangent to the plane in which the second arc-shaped part contacts and connects with the open lower end part.

Furthermore, a connection point is formed where the second end of the first arc-shaped part being connected to the first end of the second arc-shaped part, wherein an included angle formed by the tangent line to the first arc-shaped part at the connection point and the tangent line to the second arc-shaped part at the connection point is less than or equal to 20 degrees.

Furthermore, said method further comprises: configuring a front wall and a rear wall of the air flow passage, such that the front wall and the rear wall are parallel to each other and parallel to the direction from the open upper end part to the open lower end part.

Furthermore, said method further comprises: calculating an air supply parameter value of the air diffuser under a predetermined air supply condition; comparing the calculated air supply parameter value with a reference parameter value; and selecting the air diffuser, in which the air supply parameter value is most approximate to the reference parameter value.

Furthermore, the air supply parameter values comprise an average air velocity and an average air supply angle.

Furthermore, the air supply parameter values further comprise a standard deviation of air supply velocity and a standard deviation of air supply angle, and wherein the air diffuser, in which the average air velocity and the average air supply angle are most approximate to the corresponding reference parameter values, and the standard deviation of air supply velocity and the standard deviation of air supply angle are less than the corresponding reference parameter values, is selected.

Compared with the air diffuser in the prior art, the air diffuser of the disclosure may solve the problem of dust deposition around the air supply outlet, at the same time, the weight of the air diffuser is reduced, running noise is reduced, and the operation and maintenance cost is reduced.

The disclosure may be applied to civil aircraft as well as other means of transportation.

BRIEF DESCRIPTION OF THE DRAWINGS

The drawings are used for describing exemplary embodiments of the disclosure, so the technical concept of the disclosure is not intended to limit the disclosure to the drawings.

DETAILED DESCRIPTION OF THE EMBODIMENTS

The disclosure is more comprehensively described below with reference to the drawings. The drawings illustrate the exemplary embodiments of the disclosure. As those skilled in the art will realize, the described exemplary embodiments may be modified in many different ways, and all of these do not depart from the spirit and scope of the disclosure.

To overcome the defects of the air diffuser in the prior art, the disclosure presents a new air diffuser and a construction method thereof. In the air diffuser constructed by means of the present construction method, a grid structure at an open lower end part in the prior art is removed so as to avoid the dust deposition at an air supply outlet. Moreover, in the air diffuser constructed by means of the present construction method, an orifice plate in the prior art is removed so as to avoid the orifice plate from influencing air resistance, the weight of the diffuser, and noise.

Figure 1:
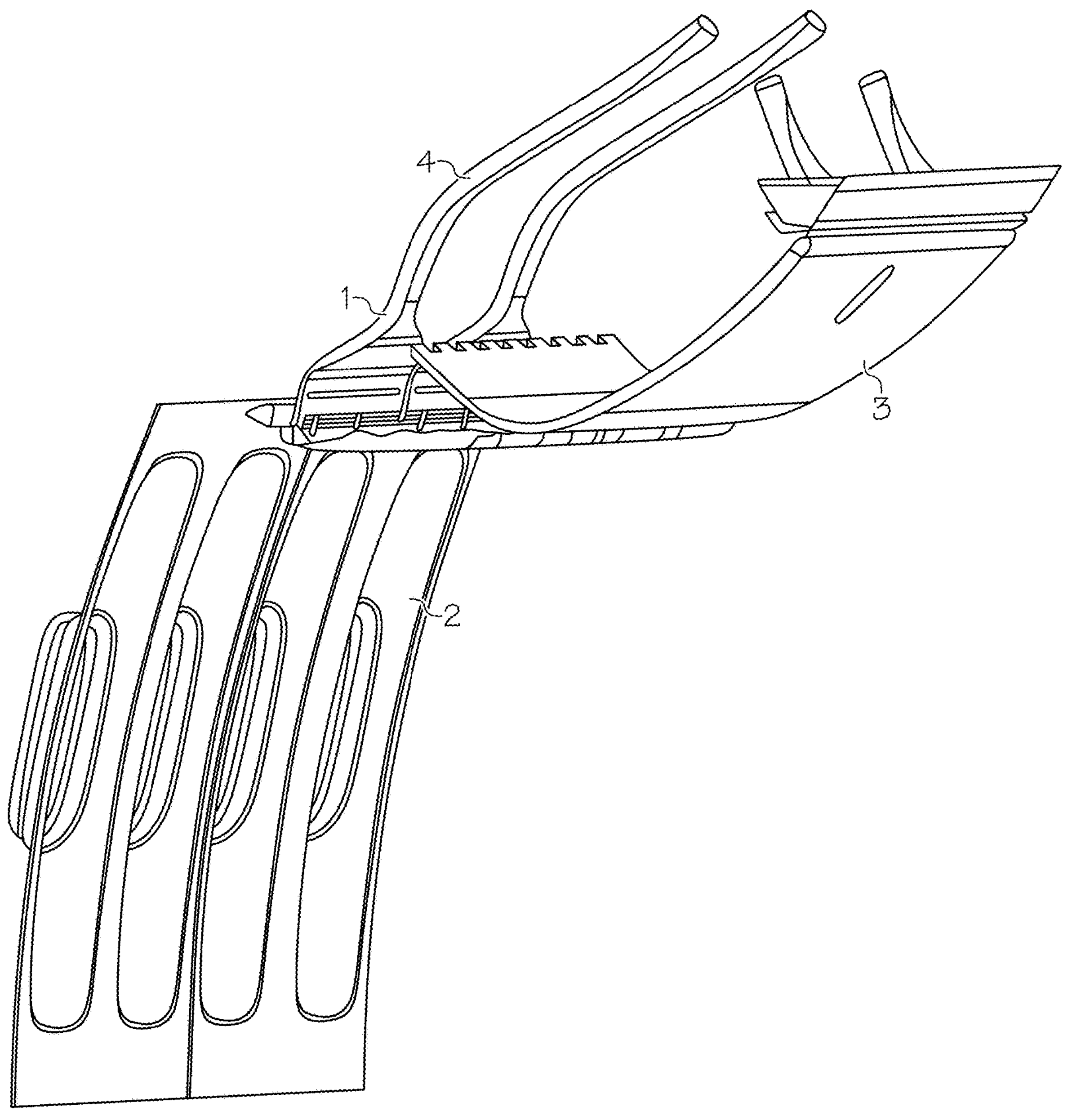
FIG. 1 is a schematic diagram of the position of an air diffuser on a civil aircraft in the prior art.
Figure 2:
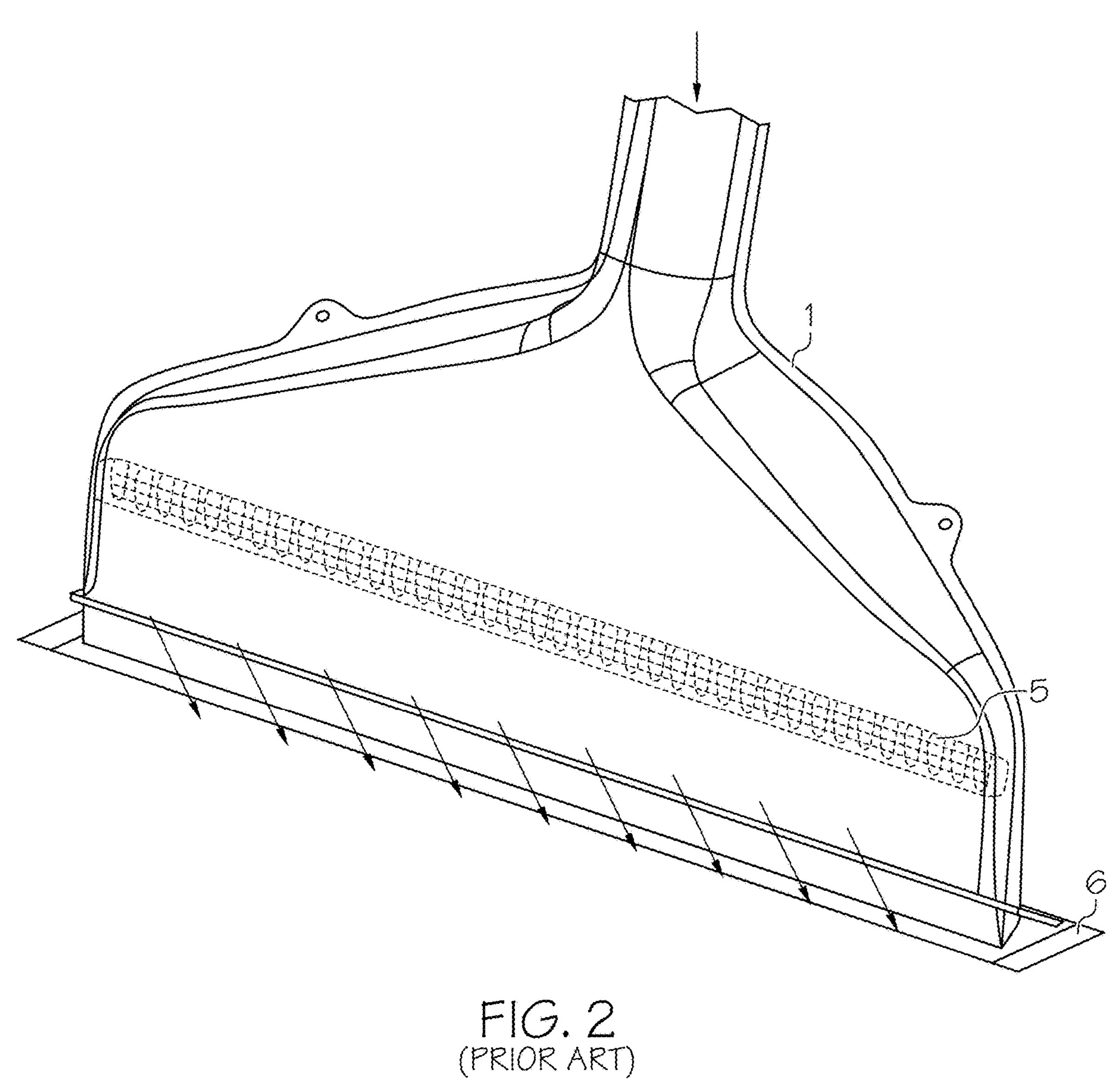
FIG. 2 is a schematic diagram of the overall structure of an air diffuser on a civil aircraft in the prior art.
Figure 3A:
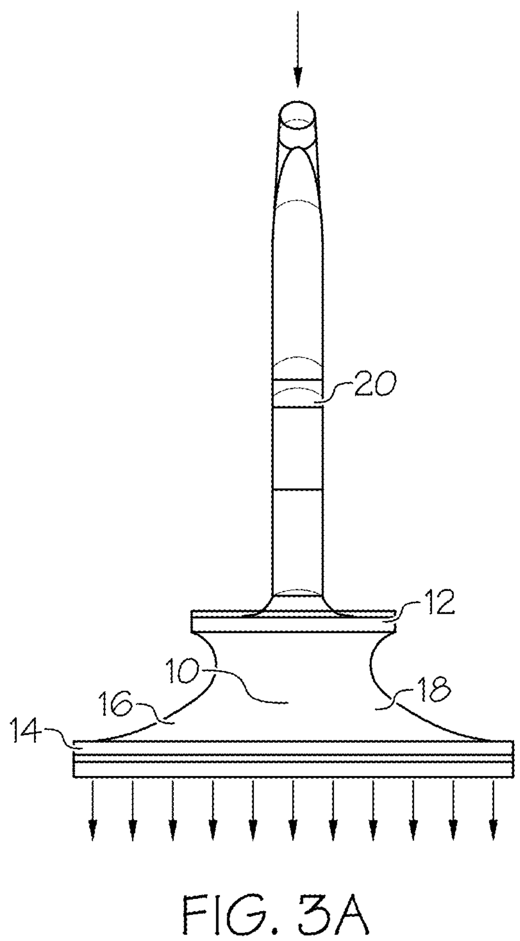
FIG. 3A, FIG. 3B and FIG. 3C are schematic diagrams of the overall outline of an air diffuser according to an embodiment of the disclosure.
Figure 3B:
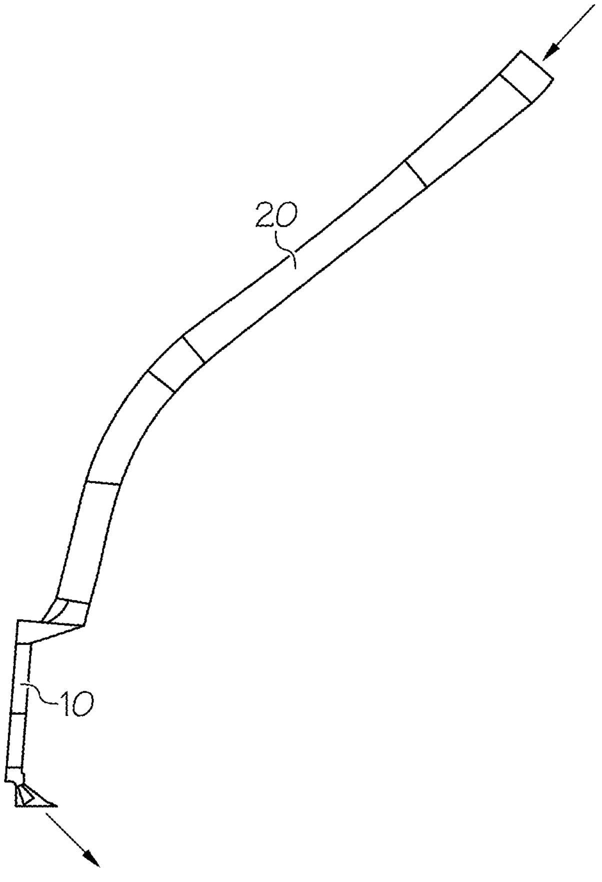
Figure 3C:
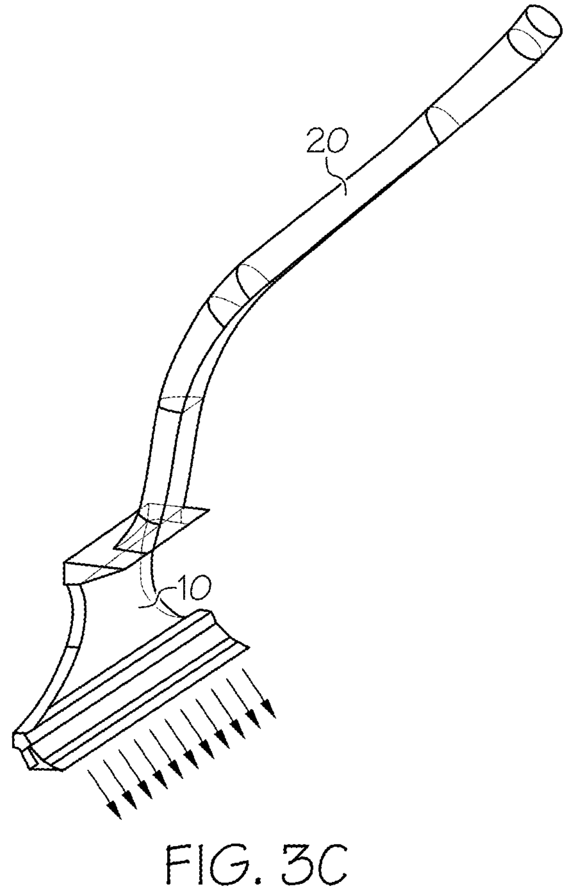

FIG. 3A, FIG. 3B and FIG. 3C are schematic diagrams of the overall outline of an air diffuser 10 according to the embodiment of the disclosure. FIG. 4 further illustrates a front view of the air diffuser 10 more clearly. As illustrated in the drawings, the air diffuser 10 comprises: an open upper end part 12, which is in fluid communication with an air supply pipe 20; an open lower end part 14, which is in fluid communication with inner space of a cabin, the open lower end part 14 being generally substantially parallel to the open upper end part 12. An air flow passage 11 of the air diffuser 10 is defined between the open upper end part 12 and the open lower end part 14, and the height corresponding to the air flow passage 11 is h. The air flow passage 11 comprises a first side wall 16 and a second side wall 18 which are connected between the open upper end part 12 and the open lower end part 14, and are symmetrically located with respect to a vertical center plane P of the air diffuser 10. In the air diffuser 10 according to the embodiment of the disclosure, the width n (corresponding to the outlet width of the air flow passage 11) of the open lower end part 14 between the first side wall 16 and the second side wall 18 is greater than the width m (corresponding to the inlet width of the air flow passage 11) of the open upper end part 12 between the first side wall 16 and the second side wall 18. Preferably, the ratio of the width of the open lower end part 14 and the width of the open upper end part 12 is about 2:1.

The air diffuser 10 further comprises a front wall and a rear wall (as shown in FIG. 3B) which are parallel to each other and parallel to the direction from the open upper end part 12 to the open lower end part 14.

According to the disclosure, the section outline of each of the first side wall 16 and the second side wall 18 has a curved shape bending inwards, such that in a direction from the open upper end part 12 to the open lower end part 14, the air flow passage has, in sequence, a contraction portion bending toward the vertical center plane P and an expansion portion away from the vertical center plane P.

Specifically, in the air diffuser 10 according to the embodiment of the disclosure, the first side wall 16 comprises a first arc-shaped part 162 and a second arc-shaped part 164 which are connected in sequence in the direction from the open upper end part 12 to the open lower end part 14; correspondingly, the second first side wall 18 comprises a first arc-shaped part 182 and a second arc-shaped part 184. The two arc-shaped parts of the first side wall 16 are respectively symmetrical with the two arc-shaped parts of the second side wall 18. Both the first arc-shaped parts 162 and 182 are curved towards the vertical center plane P. Both first ends 1622 and 1822 of the first arc-shaped parts 162 and 182 are connected to the open upper end part 12. The degree of curvature of the first arc-shaped parts 162 and 182 makes the width w of the air flow passage at at least a part of the first arc-shaped parts 162 and 182 less than or equal to the width m of the open upper end part 12. Both the second arc-shaped parts 164 and 184 are curved towards the vertical center plane P. First ends 1642 and 1842 of the second arc-shaped parts 164 and 184 are connected to the second end 1642 of the first arc-shaped part 162, and the second ends 1644 and 1844 of the second arc-shaped parts 164 and 184 are connected to the open lower end part 14.

Figure 4A:
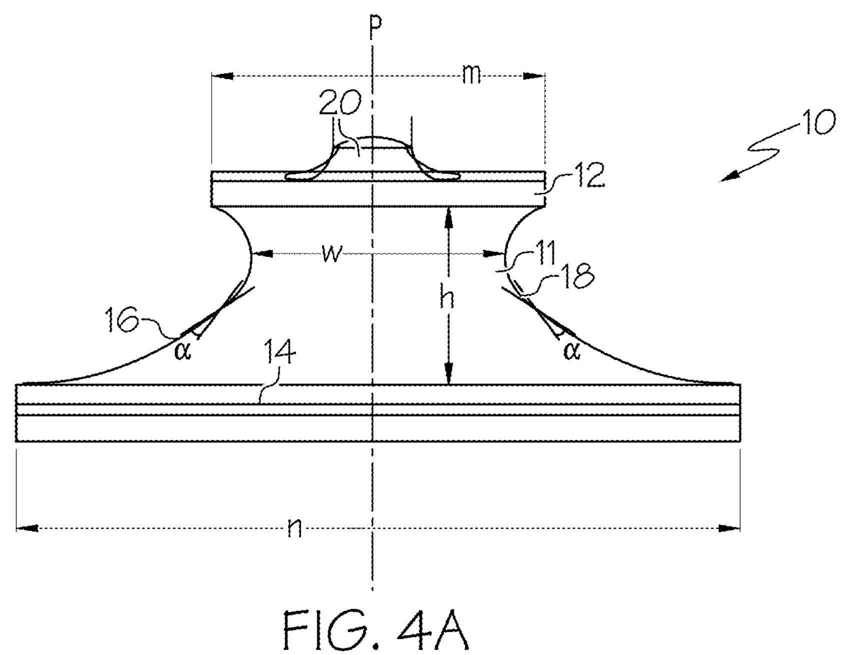
FIG. 4A and FIG. 4B are respectively a front view of the air diffuser according to the embodiment of the disclosure.
Figure 4B:
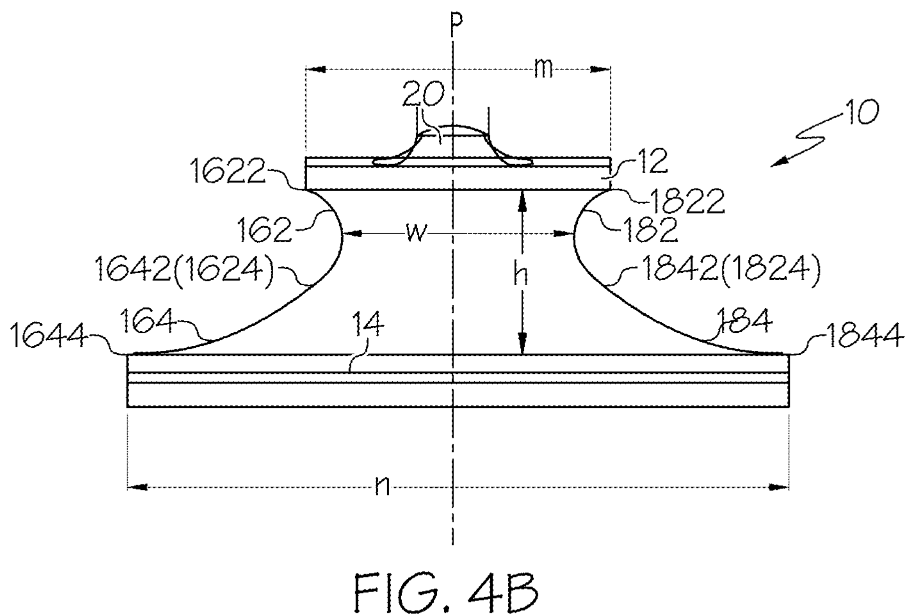

As illustrated in FIG. 4A and FIG. 4B, in the air diffuser 10 according to the embodiment of the disclosure, the radii of curvature of the first arc-shaped parts 162 and 182 are respectively less than or equal to the radii of curvature of the second arc-shaped parts 164 and 184. Besides, the first arc-shaped part 162 is defined so that the distance from the first end 1622 of the first arc-shaped part 162 to the vertical center plane P is identical to the distance from the second end 1624 of the first arc-shaped part 162 to the vertical center plane P, and the first arc-shaped part 182 is defined so that the distance from the first end 1822 of the first arc-shaped part 182 to the vertical center plane P is identical to the distance from the second end 1824 of the first arc-shaped part 182 to the vertical center plane P. Furthermore, the second arc-shaped part 164 is defined so that the second arc-shaped part 164 at its second end 1644 is tangent to the plane in which the second arc-shaped part 164 contacts and connects with the open lower end part 14, and the second arc-shaped part 184 is defined such that the second arc-shaped part 184 at its second end 1844 is also tangent to the described plane.

Preferably, referring to FIG. 4A, a first connection point is formed where the second end 1624 of the first arc-shaped part 162 is connected to the first end 1642 of the second arc-shaped part 164, the included angle α formed by a tangent line to the first arc-shaped part 162 at the first connection point and a tangent line to the second arc-shaped part 164 at the first connection point is less than or equal to a predetermined angle which is preferably 20 degrees. Similarly, a second connection point is formed where the second end 1824 of the first arc-shaped part 182 is connected to the first end 1842 of the second arc-shaped part 184, and the included angle $\alpha$ formed by the tangent line to the first arc-shaped part 182 at the second connection point and the tangent line to the second arc-shaped part 184 at the second connection point is less than or equal to a predetermined angle, preferably 20 degrees.

It has been found that the air diffuser 10 of the embodiment of the disclosure is very applicable to a transportation vehicle, and in particular, to a cabin of a civil aircraft.

Another aspect of the disclosure relates to a method for construction of an air diffuser, the construction method being used for construction of an air diffuser as defined above, the method comprises:

providing an open upper end part 12 and an open lower end part 14 of the air diffuser;

and configuring a first side wall 16 and a second side wall 18 which are connected between the open upper end part 12 and the open lower end part 14 and symmetrically located with respect to a vertical center plane P of the air diffuser 10. As shown above, the first side wall 16 and the second side wall 18 define an air flow passage 11 between the open upper end part 12 and the open lower end part 14. In the disclosure, configuring the first side wall 16 and the second side wall 18 comprises: forming the section outline of each of the first side wall 16 and the second side wall 18 into a curved shape bending inwards, such that as clearly shown in FIGS. 4A and 4B, in a direction from the open upper end part 12 to the open lower end part 14, the air flow passage 11 has, in sequence, a contraction portion bending toward the vertical center plane and an expansion portion away from the vertical center plane.

Very advantageously, the disclosure optimizes, by means of the simulation of computational fluid mechanics, the design of the structure of an air diffuser, especially section outlines of the first side wall and the second side wall of the air diffuser, to ensure the air supplying uniformity of the air diffuser.

Hereinafter, an optimization design used in the construction of the air diffuser 10 according to the specific embodiment is illustrated below in combination with FIGS. 5 to 13.

Figure 5:
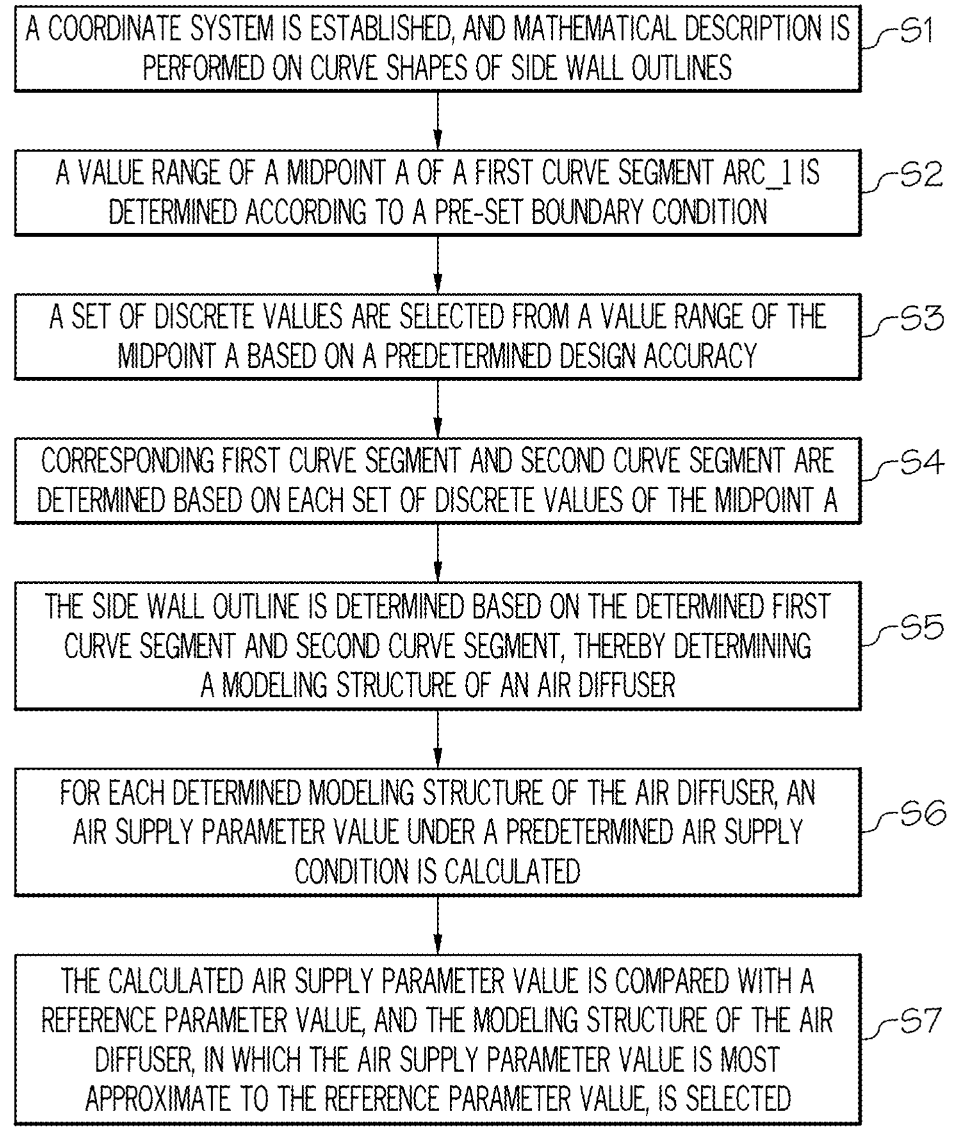
FIG. 5 is a flowchart of performing optimization design on the section outlines of side walls of the air diffuser during the construction of the air diffuser according to the embodiment of the disclosure.

FIG. 5 is a flowchart of performing optimization design on the section outlines of the side walls of the air diffuser during the construction of the air diffuser according to the embodiment of the disclosure. In order to construct the air diffuser of the disclosure, the shapes of the section outlines of the first side wall and the second side wall of the air diffuser are described mathematically. By testing different curve forms, the disclosure adopts double arc lines to perform the final mathematical description on the section outlines of the first side wall and the second side wall and constructs the corresponding air diffuser.

According to the specific embodiment of the disclosure, the following operations are performed when optimizing the design of the air diffuser:

Operation S1: a coordinate system is established, and in the coordinate system, the mathematical description is performed on curved shapes of the section outlines of side walls of the first side wall 16 and the second side wall 18 of the air diffuser 10. Specifically, an illustration is given by taking the mathematical description performed on the curved shape of the section outline of the first side wall 16 for example. A coordinate system is established by taking the lower end of the first side wall 16 as the point of origin and taking the virtual connection line between the lower end of the first side wall 16 and the lower end of the second side wall 18 (the straight virtual line locates in such a plane in which the open lower end part 14 of the air diffuser 10 contacts and connects with the first side wall 16 and the second side wall 18) as the X axis, and the Y axis is along the direction pointing from the open lower end part 14 to the open upper end part 12. In the coordinate system, a first curve segment Arc_1 and a second curve segment Arc_2, which respectively form the first arc-shaped part 162 and the second arc-shaped part 164, are established between the upper end and the lower end of the section outline of the first side wall 16. The first curve segment Arc_1 is expressed as $Arc\_1=(x-a1)^2+(y-b1)^2=R1^2$, and the second curve segment Arc_2 is expressed as $Arc\_2=x^2+(y-b2)^2=R2^2$, where a1 and b1 respectively represent the X coordinate value and the Y coordinate value of the center of a circle of the first curve segment Arc_1, R1 represents the radius of the first curve segment Arc_1, b2 represents the Y coordinate of the center of a circle of the second curve segment Arc_2, and R2 represents the radius of the second curve segment Arc_2; and operation S2: a value range of the midpoint A of the first curve segment Arc_1 is determined according to a pre-set boundary condition. In the optimization design according to the specific embodiment of the disclosure, the first curve segment Arc_1 is defined as being symmetrical with respect to a horizontal line going through the midpoint A and parallel to the X axis, and the second curve segment Arc_2 is defined such that the second arc-shaped part is tangent to the X axis at the second end thereof, and thus, the midpoint A is defined as a key node for determining the section outlines, so that for the coordinate values of each specific key node (namely the midpoint A), there is a section outline corresponding to a specific shape.

Figure 6A:
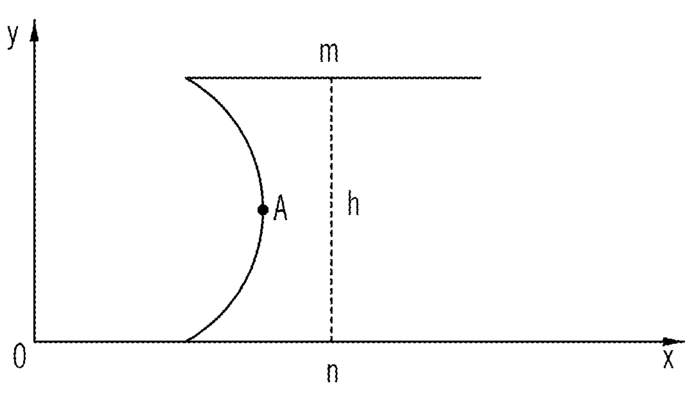
FIG. 6A, FIG. 6B, FIG. 6C and FIG. 6D schematically illustrate boundary conditions adopted when performing optimization design on the section outlines of the side walls of the air diffuser.
Figure 6B:
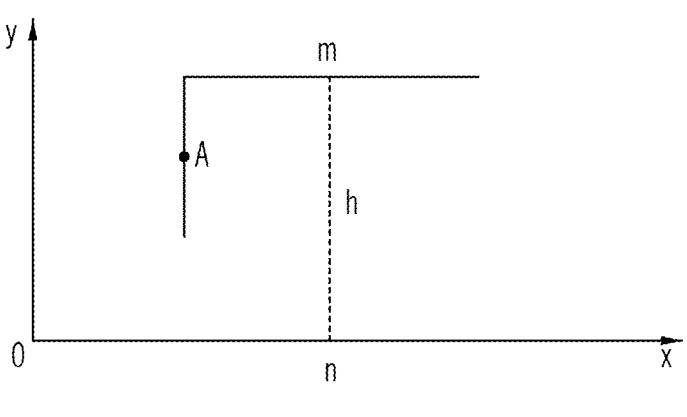
Figure 6C:
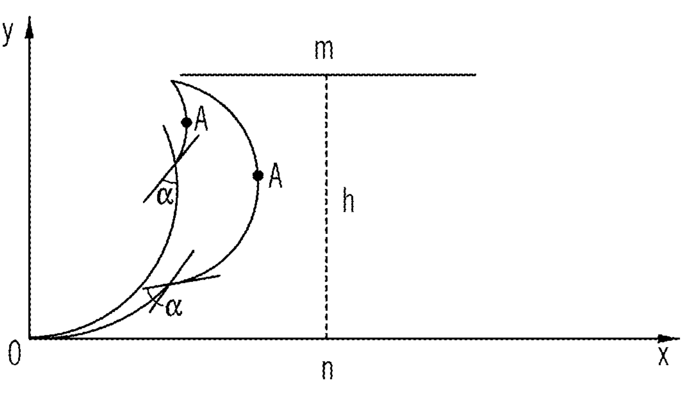
Figure 6D:
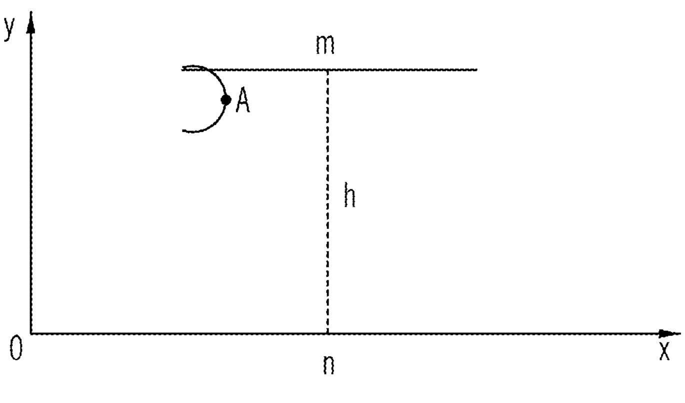

To satisfy such a specific construction, the coordinate values of the midpoint A can only be selected within a specific range, and a method for determining an allowed range of the coordinate values is illustrated in FIG. 6A, FIG. 6B, FIG. 6C, and FIG. 6D. FIG. 6A, FIG. 6B, FIG. 6C and FIG. 6D schematically illustrate boundary conditions adopted when performing optimization design on the section outlines of side walls of the air diffuser. If the width of the open upper end part 12 of the air diffuser 10 is m, the width of the open lower end part 14 is n, and the height of the air flow passage of the air diffuser 10 is h, the boundary condition in FIG. 6A is that: a Y coordinate value $Y_A$ of the midpoint A is greater than h/2, that is, the Y coordinate value of the midpoint A needs to be greater than h/2, otherwise the second arc segment Arc_2 will not exist; the boundary condition in FIG. 6B is that: a X coordinate value $X_A$ of the midpoint A is greater than (n−m)/2, that is, the X coordinate value of the midpoint A needs to be greater than (n−m)/2, otherwise the first curve segment Arc_1 will not exist. Besides, the first curve segment Arc_1 and the open upper end part 12 cannot have an overlapping part, that is, the central angle of the first curve segment Arc_1 is not greater than 180 degrees, as illustrated in FIG. 6D.

It has been found in the disclosure that when the included angle $\alpha$ formed by the tangent lines of the first curve segment Arc_1 and the second curve segment Arc_2 at their intersection point (that is, the included angle formed by the tangent line of the first curve segment Arc_1 at its second end and the tangent line of the second curve segment Arc_2 at its first end) is comparatively large, the formed transition part between the first arc-shaped part and the second arc-shaped part is not smooth, then, it is inconvenient to manufacture, and the use effect is not ideal. So, preferably, the included angle $\alpha$ formed by the tangent lines of the first curve segment Arc_1 and the second curve segment Arc_2 at their intersection point is less than or equal to a predetermined angle, preferably 20 degrees. The boundary condition is schematically illustrated in FIG. 6C.

Figure 7:
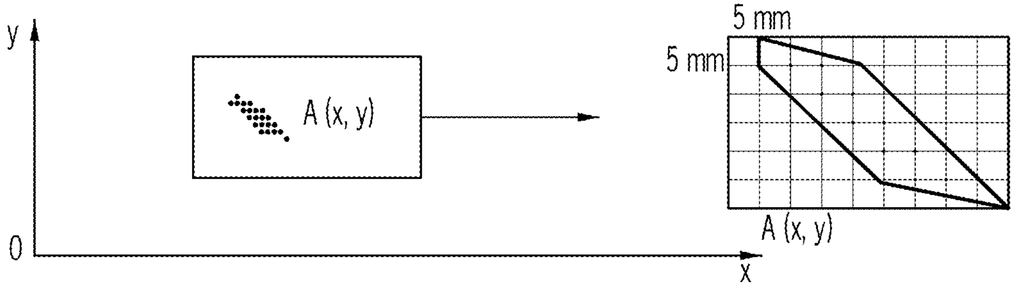
FIG. 7 schematically illustrates a value range of a midpoint A of the first curve segment in the section outlines of the side walls obtained according to the boundary conditions in FIG. 6A, FIG. 6B, FIG. 6C and FIG. 6D.

Taking an air diffuser for example, the height h of the air flow passage of the air diffuser is 143.68 mm, the width m of the open upper end part 12 is 260.92 mm, and the width m of the open lower end part 14 is 570.97 mm. It may be determined according to the boundary conditions in FIG. 6A and FIG. 6B that the Y coordinate of the midpoint A is greater than 71.84 mm, and the X coordinate is greater than 155.025 mm. Furthermore, a specific coordinate range of the midpoint A may be determined according to the boundary conditions in 6C and FIG. 6D. FIG. 7 schematically illustrates a value range of the midpoint A of the first curve segment in the section outline of the first side wall of the air diffuser obtained according to the boundary conditions in FIG. 6A, FIG. 6B, FIG. 6C and FIG. 6D.

The optimization above further comprises operation S3: a set of discrete values are selected from the value range of the midpoint A based on a predetermined design accuracy.

In the above example, the minimum value of the Y coordinate of the midpoint A is set as 80 mm, the minimum value of the X coordinate is set as 160 mm, and the design accuracy is set as 5 mm, then 22 set of different discrete coordinates of the midpoint A (namely the key mode) may be obtained in an allowed coordinate value range of the midpoint A. It is found by testing that a very good result may be obtained by setting the design accuracy of the midpoint A to 5 mm. However, other different design accuracies may also be adopted.

Preferably, the optimization above further comprises operation S4: the corresponding first curve segment and second curve segment are determined based on each set of discrete values of the midpoint A, accordingly it is determined that the first curve segment and the second curve segment can satisfy that: the first arc-shaped part is curved towards the center of the air diffuser, the second arc-shaped part is curved towards the center of the air diffuser, and the width w of the air diffuser corresponding to at least a part of the first arc-shaped part is less than or equal to the width m of the open upper end part, that is, the air flow passage of the air diffuser forms a contraction portion at the first arc-shaped part.

Thus, in the further operation S5: the section outlines of the side walls are determined based on the determined first curve segment and second curve segment, thereby determining the construction structure of the air diffuser.

By means of the optimization design above, when constructing an air diffuser, when the coordinate values of the midpoint A are selected from the allowed range, the air diffuser with a particular shape can be obtained.

To enable the shapes of the selected section outlines to realize excellent air supplying uniformity, according to the embodiment of the disclosure, in the method for construction of the air diffuser, the following operations may further be performed.

Operation S6: for example, by means of manners such as performing air supply simulation through fluid mechanics, an air supply parameter value of the air diffuser under a predetermined air supply condition is calculated; and operation S7: the calculated air supply parameter value is compared with a reference parameter value, and the air diffuser, in which the air supply parameter value is most approximate to the reference parameter value, is selected.

Preferably, the air supply parameter values may comprise an average air velocity $\overline{U}$ and an average air supply angle $\overline{\theta}$. In addition, the reference parameter values may comprise, for example, a reference average air supply velocity $\overline{U}_0$ and a reference average air supply angle $\overline{\theta}_0$ of the existing air diffuser.

Furthermore, preferably, the air supply parameter values may also comprise a standard deviation of air supply velocity $\sigma_U$ and a standard deviation of air supply angle $\overline{\theta}_0$. The reference parameter values may further comprise a standard deviation of reference air supply velocity $\sigma_{U,0}$ and a standard deviation of reference air supply angle $\sigma_{\theta,0}$. At this time, correspondingly, a construction structure of the air diffuser, in which the average air supply velocity $\overline{U}$ and the average air supply angle $\overline{\theta}$ are respectively most approximate to the reference average air supply velocity $\overline{U}_0$ and the reference average air supply angle $\overline{\theta}_0$ (namely $\overline{\theta}\rightarrow\overline{\theta}_o$, $\overline{\theta}\rightarrow\overline{\theta}_o$), and the standard deviation of air supply velocity $\sigma_U$ and the standard deviation of air supply angle $\sigma_\theta$ are respectively less than the standard deviation of reference air supply velocity $\sigma_{U,0}$ and the standard deviation of reference air supply angle $\sigma_{\theta,0}$ (namely $\sigma_U\leq\sigma_{U,o}$, $\sigma_\theta\leq\sigma_{\theta,o}$), is selected as a final construction. The final construction can provide the same air supply velocity and air supply angle as the existing air diffuser, and has better air supplying uniformity.

In the above example, the air supply situations of 22 air diffusers obtained by means of optimization design are simulated. The reference average air velocity $\overline{U}_0$ of the existing air diffuser is set as 3.42 m/s, the average air supply angle $\overline{\theta}_0$ is set as 34.8 degrees, the standard deviation of reference air supply velocity $\sigma_{U,0}$ is set as 3.16 m/s, and the standard deviation of reference air supply angle $\sigma_{\theta,0}$ is set as 17.8 degrees. When the coordinates of the midpoint A are $X_A$=165 and $Y_A$=110, the average air velocity $\overline{U}$ is 3.03 m/s, and the difference between it and the reference average air velocity $\overline{U}_0$ is too large, so the construction structure cannot be taken as a qualified design. When the coordinates of the midpoint A are $X_A$=170 and $Y_A$=100, the average air supply angle $\overline{\theta}$ is 29 degrees, and the difference between it and the reference average air supply angle $\overline{\theta}_0$ is too large, so the construction structure cannot be taken as a qualified design. When the coordinates of the midpoint A are $X_A$=185 and $Y_A$=100, the average air velocity U is 3.4 m/s, the average air supply angle $\overline{\theta}$ is 33.5 degrees, the standard deviation of air supply velocity $\sigma_U$ is 2.57 m/s, and the standard deviation of air supply angle $\sigma_\theta$ is 17.79 degrees, which satisfies the above conditions, and then may be taken as the final design, as illustrated in FIGS. 4A and 4B. In the air diffuser with the final design, the parameters of the first curve segment Arc_1 and the second curve segment Arc_2 of the section outlines of the side walls are: a1=138.4 mm, b1=100.0 mm, R1=46.6 mm, b2=250.7 mm, and R2=250.7 mm. The coordinate values $X_A$ and $Y_A$ of the midpoint A as the key node are respectively 185 and 100. So, the math equation of the first curve segment Arc_1 is $(x-138.4)^2+(y-100)^2=46.6^2$, and the math equation of the second curve segment Arc_2 is $x^2+(y-250.7)^2=250.7^2$.

Figure 8:
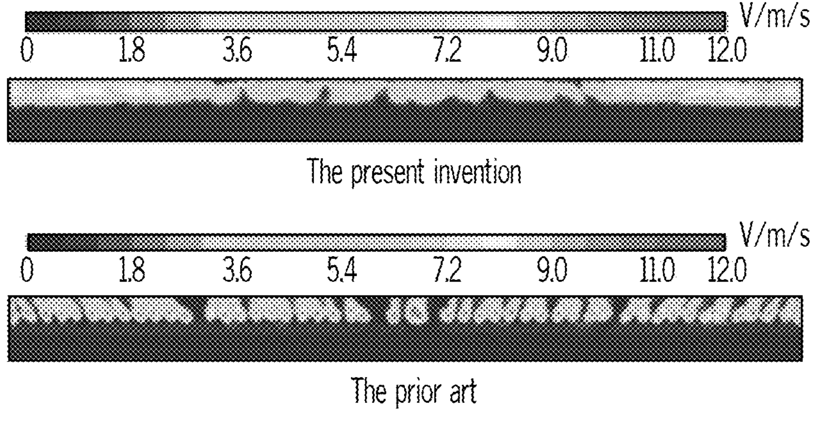
FIG. 8 illustrates a comparison between an air velocity distribution of the air diffuser according to the embodiment of the disclosure and an air velocity distribution of the air diffuser in the prior art.

FIG. 8 illustrates a comparison between an air supply velocity distribution at the open lower end part of the air diffuser according to the embodiment of the disclosure and an air supply velocity distribution at the open lower end part of the air diffuser in the prior art. As illustrated in the drawing, the air diffuser according to the embodiment of the disclosure has good air supplying uniformity, and is better than the air diffuser in the prior art. When compared with the existing air diffuser including the orifice plate and the grid structure, the standard deviation of air supply velocity of the embodiment of the disclosure is reduced by 18.4%, which indicates that its uniformity is better than the uniformity of the existing air diffuser.

Figure 9:
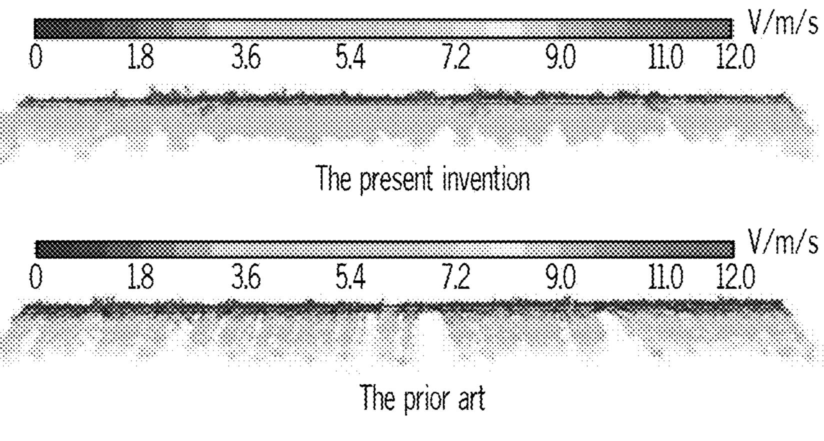
FIG. 9 illustrates a comparison between an air supply velocity vector diagram of the air diffuser according to the embodiment of the disclosure and an air supply velocity vector diagram of the air diffuser in the prior art.

FIG. 9 illustrates a comparison between an air supply velocity vector diagram at the open lower end part of the air diffuser according to the embodiment of the disclosure and an air supply velocity vector diagram at the open lower end part of the air diffuser in the prior art. As illustrated in the drawing, the air diffuser according to the embodiment of the disclosure can provide the air supply velocity and angle which are very approximate to the air supply velocity and angle of the existing air diffuser.

Figure 10:
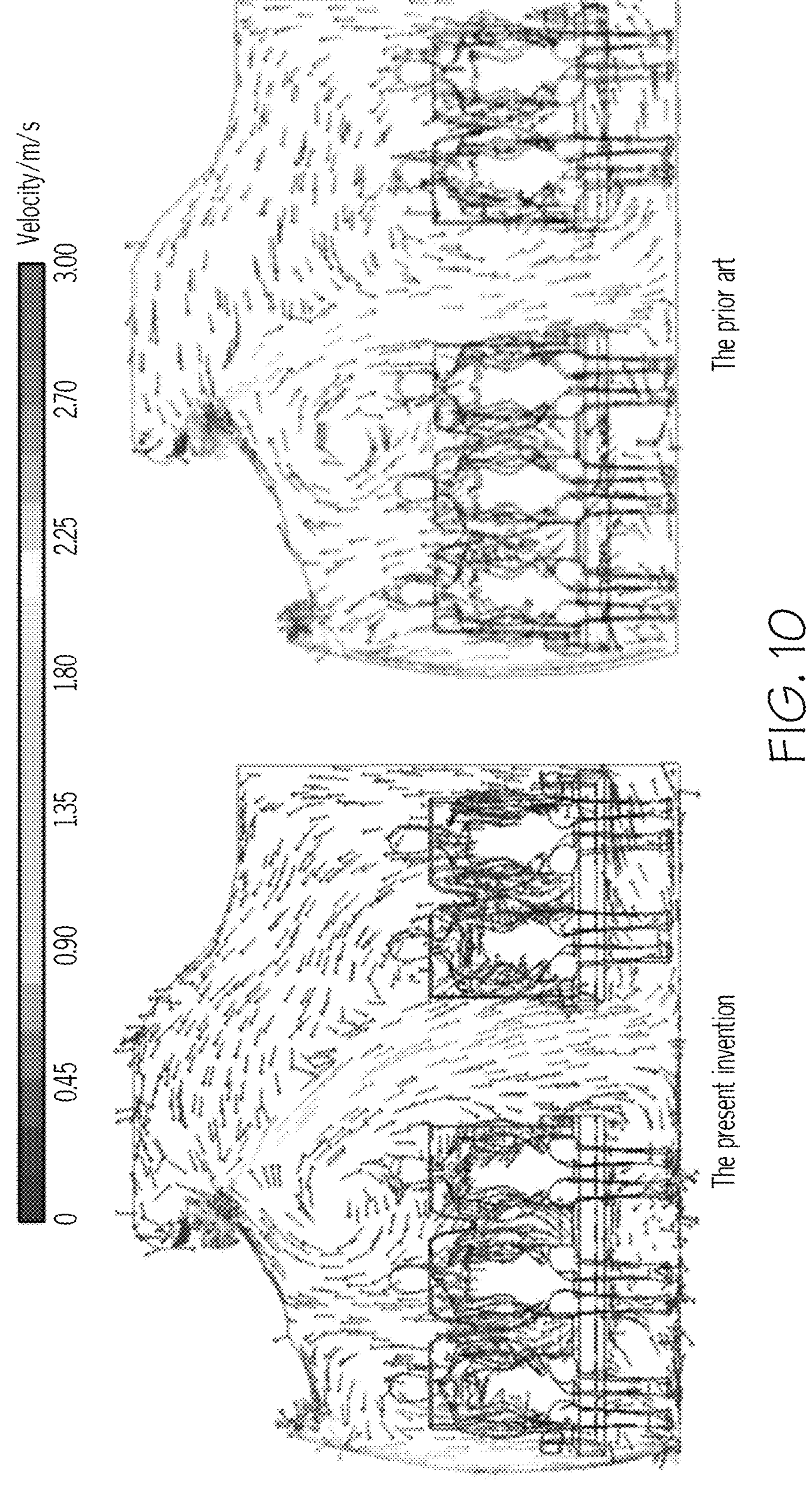
FIG. 10 illustrates a comparison between an air flow distribution on the cross section of a cabin, after the air diffuser according to the embodiment of the disclosure is mounted within the cabin of a civil aircraft, and an air flow distribution of the air diffuser in the prior art.
Figure 11:
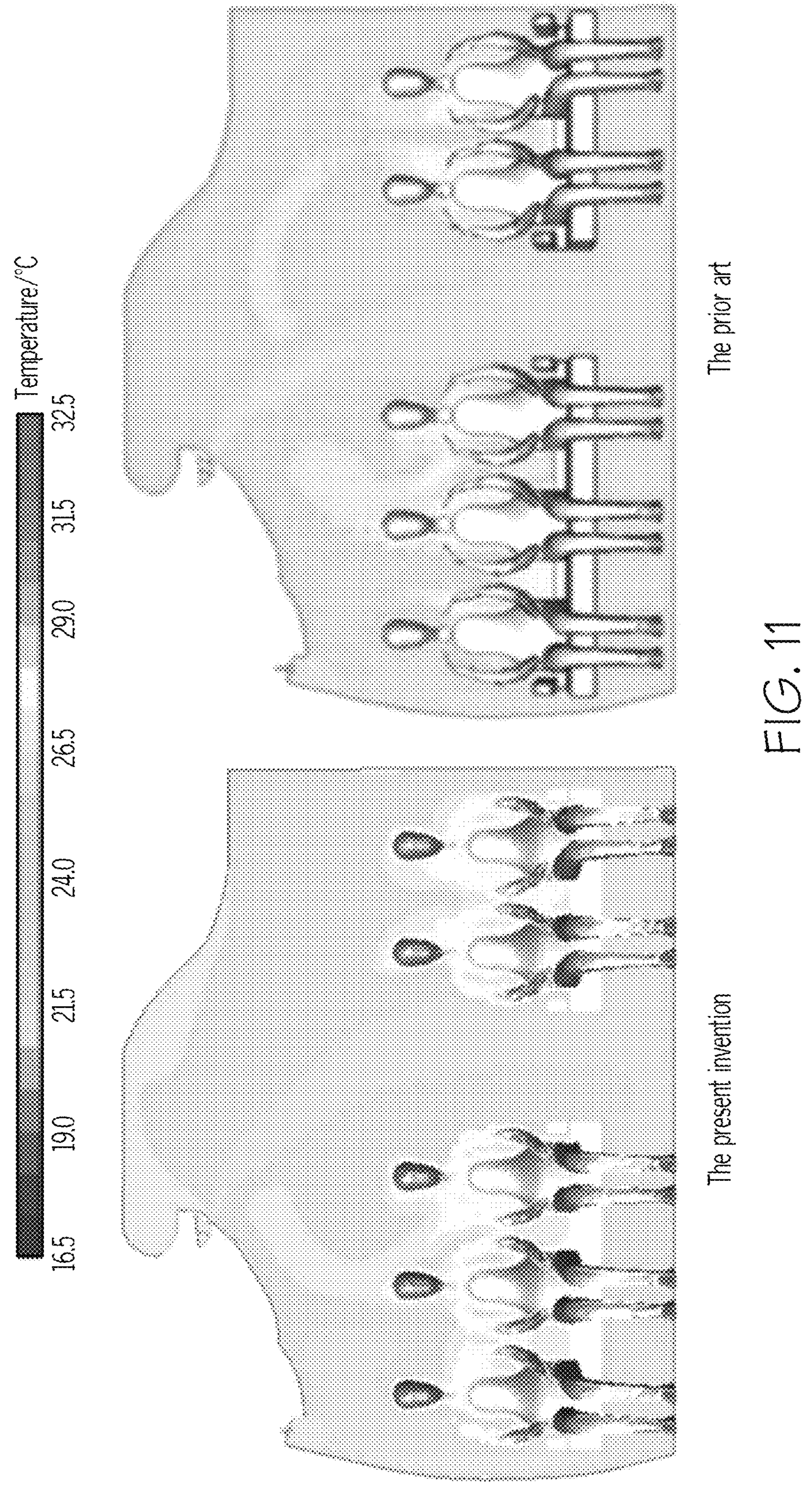
FIG. 11 illustrates a comparison between a temperature distribution on the cross section of a cabin, after the air diffuser according to the embodiment of the disclosure is mounted within the cabin of a civil aircraft, and a temperature distribution of the air diffuser in the prior art.

The air diffuser according to the embodiment of the disclosure is mounted within a simulated cabin, and simulated calculation is performed on air flow distribution and temperature distribution in the simulated cabin by using the computational fluid mechanics. FIG. 10 illustrates a comparison between an air flow distribution on the cross section of a cabin, after the air diffuser according to the embodiment of the disclosure is mounted within the cabin of a civil aircraft, and an air flow distribution of the existing air diffuser. FIG. 11 illustrates a comparison between a temperature distribution on the cross section of a cabin, after the air diffuser according to the embodiment of the disclosure is mounted within the cabin of a civil aircraft, and a temperature distribution of the existing air diffuser. Compared with the existing air diffuser, the air diffuser according to the embodiment of the disclosure can achieve the same air flow distribution and temperature distribution, thereby meeting a thermal comfort requirement in the cabin.

Figure 12:
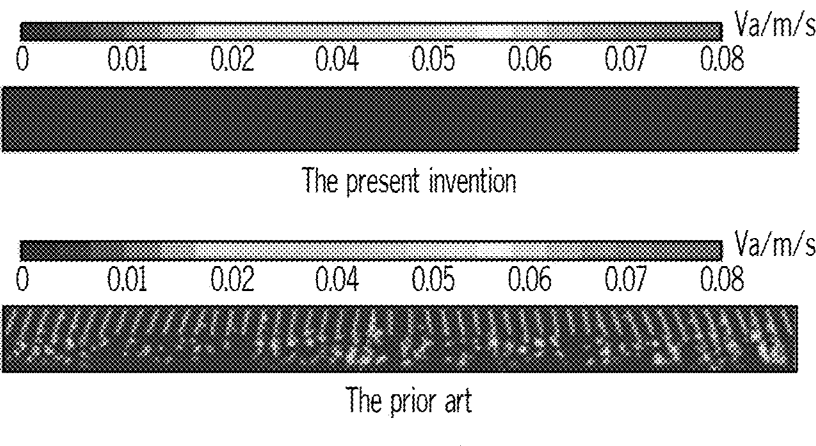
FIG. 12 illustrates a comparison between a dust deposition velocity distribution at an open lower end part of the air diffuser according to the embodiment of the disclosure and a dust deposition velocity distribution at the open lower end part of the air diffuser in the prior art.
Figure 13:
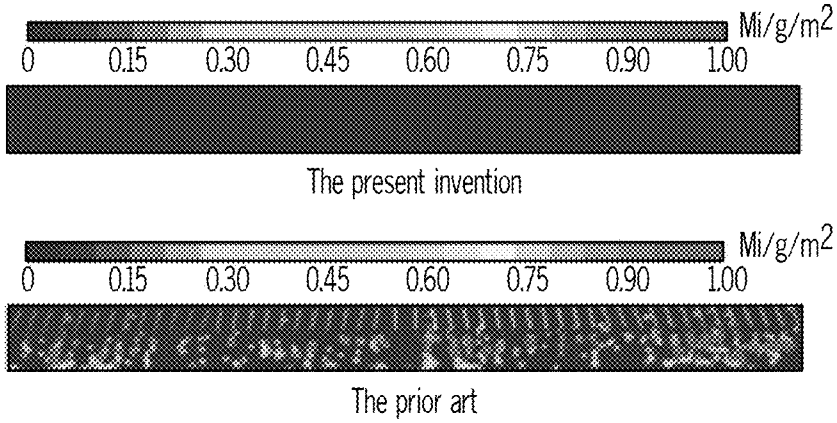
FIG. 13 illustrates a comparison between dust deposition per unit area at the open lower end part of the air diffuser according to the embodiment of the disclosure after three months' use and dust deposition per unit area at the open lower end part of the air diffuser in the prior art after three months' use.

In the disclosure, the dust deposition around the air supply outlet of the air diffuser is further calculated by means of an aerosol dynamics simulation based on the Lagrange method. FIG. 12 illustrates a comparison between a dust deposition velocity distribution at an open lower end part of the air diffuser according to the embodiment of the disclosure and a dust deposition velocity distribution at the open lower end part of the air diffuser in the prior art. FIG. 13 illustrates a comparison between dust deposition per unit area at the open lower end part of the air diffuser according to the embodiment of the disclosure after three months' use and dust deposition per unit area at the open lower end part of the air diffuser in the prior art after three months' use. As illustrated in the drawings, the dust deposition velocity at the open lower end part of the air diffuser according to the embodiment of the disclosure is nearly zero, and there is nearly no dust deposition after the aircraft runs for three months. But there is a lot dust depositing at the open lower end part of the existing air diffuser including the orifice plate and the grid structure, and after the aircraft runs for three months, the dust deposition at many positions is more than 1 g/m$^2$, which is a very serious case of dust deposition. The air diffuser according to the embodiment of the disclosure solves the problem of dust deposition of the existing air diffuser well.

In addition, compared with the existing air diffuser, the weight of the air diffuser which is constructed by using the method of the embodiment of the disclosure and applied to the civil aircraft may be reduced by 36.4%. The main reason is that the air diffuser of the disclosure does not need the orifice plate and the grid structure to ensure the air supplying uniformity. At the same time, both the results of measurement and simulation show that the noise generated by the air diffuser constructed by using the embodiment of the disclosure is lower than the noise generated by the existing air diffuser.

To sum up, the new-type air diffuser provided by the disclosure has very significant advantages in avoiding the dust deposition, improving the air supplying uniformity, and reducing the weight etc., thereby reducing the operation and maintenance cost for the aircraft, the air diffuser is very applicable to a transportation vehicle such as a civil aircraft; while the air diffuser may for example, ensure the thermal comfort within the cabin identical with that of the traditional design, satisfying the noise requirement and meeting the requirement of the cabin environment control.

Although the disclosure has been described in combination with the exemplary embodiment which is currently considered practical, it should be understood that the disclosure is not limited to the disclosed exemplary embodiment, on the contrary, the disclosure is intended to cover various modifications and equivalent arrangements included in the spirit and scope of the attached claims.

What is claimed is:

1. An air diffuser, comprising:

an open upper end part, the open upper end part comprising an upper wall and an air supply inlet in the upper wall for connecting with an air supply pipe;

an open lower end part; and an air flow passage defined between the open upper end part and the open lower end part, the air flow passage comprising a first side wall and a second side wall which are connected between the open upper end part and the open lower end part, and are symmetrically located with respect to a vertical center plane of the air diffuser;

wherein the section outline of each of the first side wall and the second side wall has a curved shape bending inwards, such that in a direction from the open upper end part to the open lower end part, the air flow passage has, in sequence, a contraction portion bending toward the vertical center plane and an expansion portion away from the vertical center plane, and wherein a maximum width of the air inlet in the upper wall is less than a minimum width of the air flow passage between the first side wall and the second side wall.

2. The air diffuser as claimed in claim 1, wherein the curved shape comprises a first arc-shaped part and a second arc-shaped part connected in sequence in the direction from the open upper end part to the open lower end part.

3. The air diffuser as claimed in claim 2, wherein at least a portion of the first arc-shaped part is curved towards the vertical center plane, a first end of the first arc-shaped part is connected to the open upper end part, and the width of the air flow passage at at least a part of the first arc-shaped part is less than or equal to the width of the open upper end part between the first side wall and the second side wall.

4. The air diffuser as claimed in claim 3, wherein at least a portion of the second arc-shaped part is curved away from the vertical center plane, a first end of the second arc-shaped part is connected to a second end of the first arc-shaped part, and a second end of the second arc-shaped part is connected to the open lower end part.

5. The air diffuser as claimed in claim 4, wherein the first arc-shaped part is formed such that the radius of curvature of the first arc-shaped part is less than the radius of curvature of the second arc-shaped part.

6. The air diffuser as claimed in claim 4, wherein the first arc-shaped part is formed such that the distance from the first end of the first arc-shaped part to the vertical center plane is identical to the distance from the second end of the first arc-shaped part to the vertical center plane.

7. The air diffuser as claimed in claim 4, wherein the second arc-shaped part is formed such that the second arc-shaped part at its second end is tangent to the plane in which the second arc-shaped part contacts and connects with the open lower end part.

8. The air diffuser as claimed in claim 4, wherein a connection point is formed where the second end of the first arc-shaped part being connected to the first end of the second arc-shaped part, wherein an included angle formed by the tangent line to the first arc-shaped part at the connection point and the tangent line to the second arc-shaped part at the connection point is less than or equal to 20 degrees.

9. The air diffuser as claimed in claim 1, wherein the width of the open lower end part between the first side wall and the second side wall is greater than the width of the open upper end part between the first side wall and the second side wall.

10. The air diffuser as claimed in claim 9, wherein the ratio of the width of the open lower end part and the width of the open upper end part is about 2:1.

11. The air diffuser as claimed in claim 1, wherein the air diffuser has an average air supply speed ranging from 3 m/s to 4 m/s at the open lower end part.

12. The air diffuser as claimed in claim 11, wherein the air diffuser has an average air supply angle ranging from 30 degrees to 40 degrees at the open lower end part.

13. The air diffuser as claimed in claim 1, wherein the air diffuser further comprises a front wall and a rear wall which are parallel to each other and parallel to the direction from the open upper end part to the open lower end part.

14. The air diffuser as claimed in claim 1, wherein the air diffuser is used on a transportation vehicle.

15. The air diffuser as claimed in claim 14, wherein the transportation vehicle is an aircraft, and the air diffuser is mounted within a cabin of the aircraft.

16. A method for construction of the air diffuser of claim 1, comprising:

providing the open upper end part and the open lower end part of the air diffuser; and configuring the first side wall and the second side wall which are connected between the open upper end part and the open lower end part and symmetrically located with respect to the vertical center plane of the air diffuser, the first side wall and the second side wall define the air flow passage between the open upper end part and the open lower end part;

wherein configuring the first side wall and the second side wall comprises:

forming the section outline of each of the first side wall and the second side wall into the curved shape bending inwards, such that in the direction from the open upper end part to the open lower end part, the air flow passage has, in sequence, the contraction portion bending towards the vertical center plane and the expansion portion away from the vertical center plane.

17. The air diffuser as claimed in claim 1, wherein a distance between the first side wall and the second side wall at the top of the open upper end part is greater than a distance between the first side wall and the second side wall at the bottom of the open upper end part.

18. An aircraft comprising:

a cabin defined by a cabin side wall and a luggage compartment arranged above the side wall;

an air diffuser located between the cabin side wall and the luggage compartment, the air diffuser having an upper end and a lower end and being in fluid communication with an interior space of the cabin at the lower end; and an air supply pipe connected to the upper end of the air diffuser and configured to deliver conditioned air into the air diffuser, wherein the air diffuser defines an air-flow passage extending from the upper end to the lower end, the air-flow passage including opposing diffuser side walls connected between the upper and lower ends, wherein each of the diffuser side walls has a curved shape bending inward such that, in a direction from the upper end to the lower end, the air-flow passage includes, in sequence, a contraction portion bending toward a vertical center plane of the air diffuser and an expansion portion bending away from the vertical center plane, and wherein the upper end of the air diffuser comprises an upper wall having an air inlet for connection with the air supply pipe, and wherein a maximum width of the air inlet is less than a minimum width of the air-flow passage between the diffuser side walls.

19. The aircraft of claim 18, wherein the air diffuser is free of an orifice plate and a grid structure at the lower end.

20. The aircraft of claim 18, wherein the air diffuser further comprises a front wall and a rear wall which are parallel to each other.

* * * * *